2 Sheets—Sheet 1.

P. HINKLE.
AIR CHAMBERS FOR FORCING WATER FOR OPERATING ELEVATORS, &c.

No. 183,055. Patented Oct. 10, 1876.

Witnesses:
Lewis F. Broust,
A. P. Grant.

Inventor:
Philip Hinkle.
by John A. Wiedersheim,
Attorney.

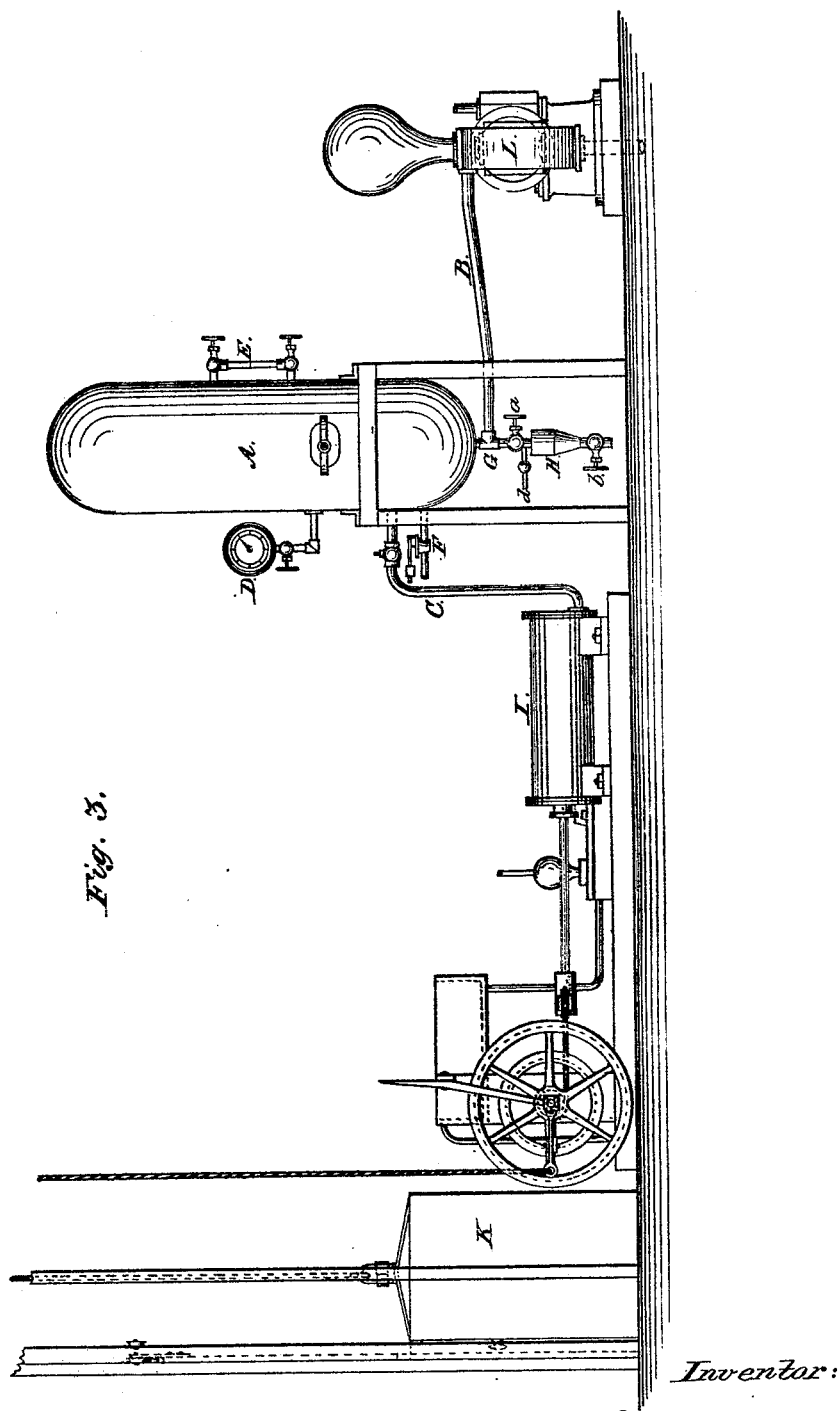

UNITED STATES PATENT OFFICE.

PHILIP HINKLE, OF SAN FRANCISCO, CALIFORNIA.

IMPROVEMENT IN AIR-CHAMBERS FOR FORCING WATER FOR OPERATING ELEVATORS, &c.

Specification forming part of Letters Patent No. 183,055, dated October 10, 1876; application filed August 22, 1876.

*To all whom it may concern:*

Be it known that I, PHILIP HINKLE, of the city and county of San Francisco and State of California, have invented a new and useful Improvement in Air-Chambers for Forcing Water for Operating Elevators, and for other purposes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
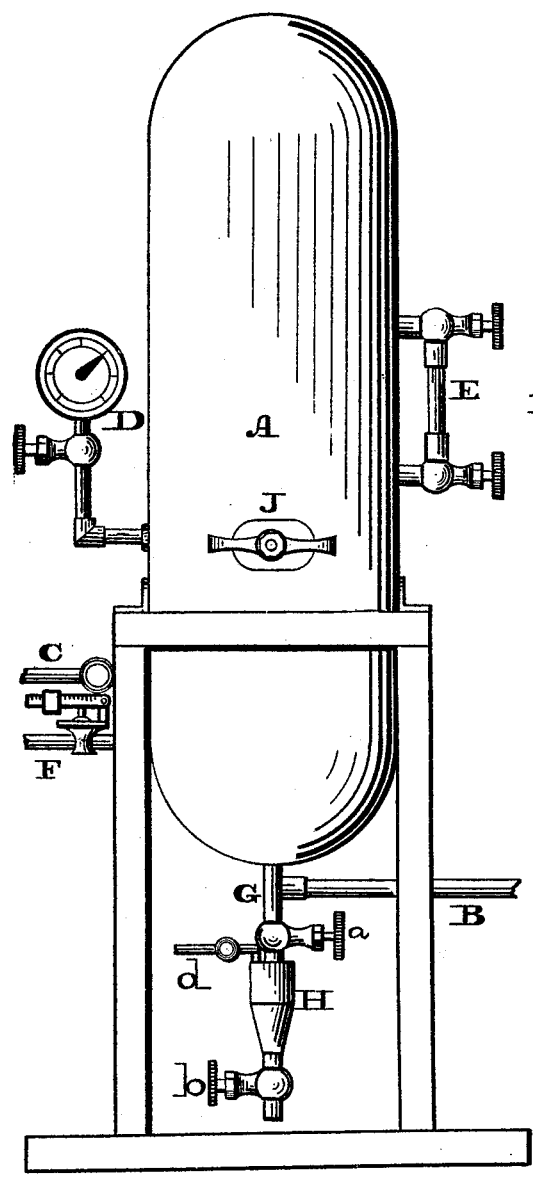
Figure 2:
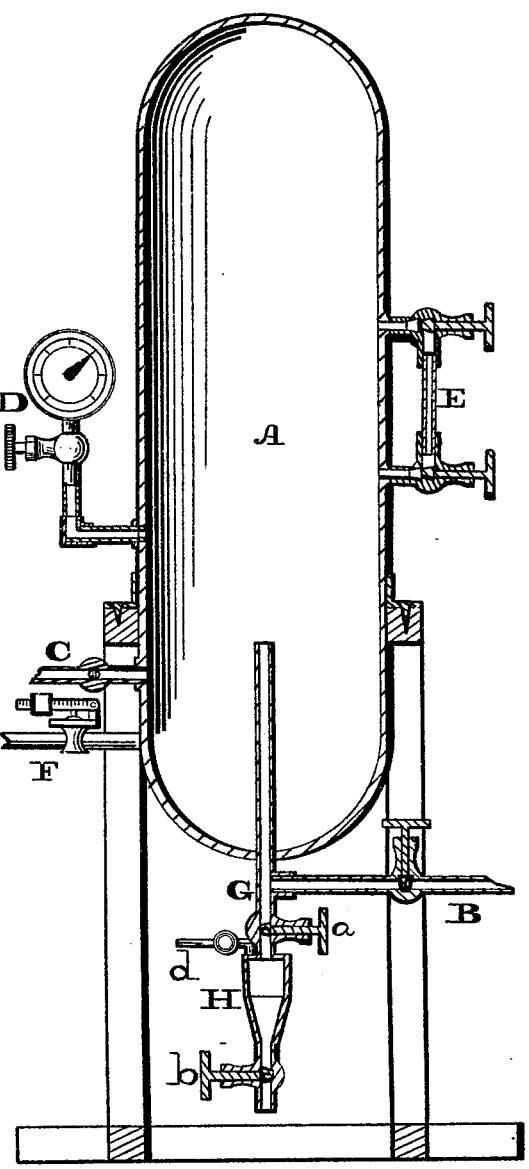

Figure 1 is a side elevation of the air-chamber embodying my invention. Fig. 2 is a central vertical section thereof. Fig. 3 shows my device applied.

Similar letters of reference indicate corresponding parts in the figures.

When it is desirable to use hydraulic elevators, and a sufficient head of water cannot be obtained, though the water can be obtained in desired quantities, the ordinary method would be to pump the water by a force-pump directly into the cylinder, and thus force the piston along. In doing this, however, every stroke of the pump is transmitted through the cylinder, and so seriously jars the elevator as to prevent the use of such pumps for elevators.

The object of my invention is to avoid the before-mentioned serious disadvantage, and be thus able to utilize water under a low head for hydraulic elevators; and my invention consists in a large water and air chamber or tank interposed between the ordinary force-pump and the elevator-cylinder, in which pressure enough is accumulated to raise the elevator by forcing water into the elevator-cylinder directly from the said chamber or tank.

The chamber has a mud-drum for discharging sediment collected in the chamber, and a branch of the inlet-pipe projects into the chamber and extends above the outlet or discharge pipe, so that when air is taken in the chamber it will be directed away from the water-discharge pipe.

Referring to the drawings, an elevator, K, has its cylinder I connected with pipe C, and a force-pump, L, has pipe B connecting with an air-chamber, A, consisting of a strong vessel, preferably of cylindrical form. B represents a pipe leading to the chamber A, and C represents a pipe leading from said chamber, the two pipes constituting, respectively, the inlet and outlet for water. Attached to the chamber A are a pressure-gage, D, water-gage E, and safety or blow-off valve F, which are located at suitable portions of the chamber. To the inlet-pipe B there is secured a communicating pipe, G, which projects into the chamber A at the base thereof, and its upper end extends above the outlet or discharge pipe C, as more readily seen in Fig. 2. To the lower end of the pipe G there is secured a drum, H, which is provided above and below with valves $a$ $b$ and an air-inlet valve, $d$.

The engine or mechanism for pumping water will be connected to the pipe B, and the water forced thereby will pass through the pipes B and G into the chamber, of which it will occupy the lower portion to the extent of, say, one-half, more or less, the remaining or upper portion being occupied with air, so that the water will be under pressure. When the water is required for service the stop-cock of the discharge-pipe C will be opened, and the water will be directed through said pipe C to the elevator-cylinder or other place of service.

Should, however, it be found that there is not sufficient air in the chamber A, air will be admitted thereinto through the drum H, and as the top of the pipe G extends above the pipe C, it is evident that the air will be conveyed sufficiently above said pipe C as not to seek the same, and it is thus prevented from passing out into the elevator-cylinder; but it will reach the volume of air in the upper portion of the chamber.

Sediment will be collected in the drum H, and when it is to be discharged I open the valves $a$ $b$, also the air-valve $d$, so as to admit air from above, and thus the sediment will flow from the drum.

The pressure can be read off at the gage D, the height of water indicated by the gage E, and in the event of excess of pressure, provision will be made to relieve the same by means of the safety-valve F.

It will also be seen that there may be had a sufficient supply of water under pressure for operative purposes, even when the pumping engine or mechanism is at rest, as the accumulation of pressure in the chamber is to be used. I may employ a pump, or such construction that when there is a determined amount of pressure in the chamber A the pump shuts off, but when the pressure lowers the pump again starts. J represents a man-hole, by which access may be had to the interior of the chamber A.

In cold climates the chamber A will be covered with asbestus, or other suitable material, in order to prevent freezing of water in said chamber.

A quantity of oil should be placed in the chamber A, so as to float in the water and form a cushion between the air and water. The oil, being much less penetrable by the air than the water, prevents a surplus of air becoming mechanically entangled with the water when pressure is applied.

Having thus described my invention, what I claim as new, and desire to secure by Letters Patent, is—

1. In a hydraulic hoisting device, an air and water chamber, A, interposed between and communicating with the elevator-cylinder and a pressure-generator, substantially as described.

2. In combination with chamber A and pipe G, the mud-drum H, provided with cocks $a$ $b$ $d$, as set forth.

3. In an air and water chamber, substantially as set forth, an oil-cushion floating on the surface of the water, and thereby interposed between it and the air, as described.

PHILIP HINKLE.

Witnesses:
    JOHN A. WIEDERSHEIM,
    H. E. HINDMARSH.